United States Patent [19]
Tupper

[11] 3,843,074
[45] Oct. 22, 1974

[54] APPARATUS FOR PROCESSING TIRE CASINGS

[76] Inventor: Myron D. Tupper, Rt. 3, Box 158, Sandy, Oreg. 97055

[22] Filed: May 7, 1973

[21] Appl. No.: 357,591

Related U.S. Application Data

[63] Continuation of Ser. No. 202,967, Nov. 29, 1971, Pat. No. 3,731,884.

[52] U.S. Cl.................... 241/222, 83/176, 83/349, 83/461, 269/20
[51] Int. Cl............................................. B26d 1/28
[58] Field of Search .......... 83/176, 349, 461, 356.3, 83/411; 241/222, 14, 220, 55, 56; 51/132; 269/20

[56] References Cited
UNITED STATES PATENTS

| | | | |
|---|---|---|---|
| 2,214,461 | 9/1940 | Hendry | 83/176 |
| 2,321,936 | 6/1943 | Pollock | 51/132 |
| 3,656,697 | 4/1972 | Nelson | 83/176 X |

*Primary Examiner*—Willie G. Abercrombie
*Attorney, Agent, or Firm*—Kolisch, Hartwell & Dickinson

[57] ABSTRACT

Apparatus for preparing fragments from tire casings and the like including clamp means for holding a tire casing by clamping onto its bead region, such clamp means being adjustable to accommodate different diameters in said bead regions. Cooperating tire casing confining means, more specifically squeeze members, are adapted to be brought together to bear against opposite sides of a tire casing held by the clamp means, in that portion of the tire casing spaced radially outwardly of its bead region. The spacing of the tire casing confining means with respect to the axis of a tire casing held by said clamp means increases with an adjustment made in the clamp means to accommodate a larger diameter bead region, and conversely, this spacing decreases with an adjustment made to accommodate a smaller diameter bead region. In this way, the tire casing confining means may be maintained in optimum position to confine substantially all of the tire casing save for the casing's bead region, regardless of differences in the diameters of successive tire casings handled.

5 Claims, 5 Drawing Figures

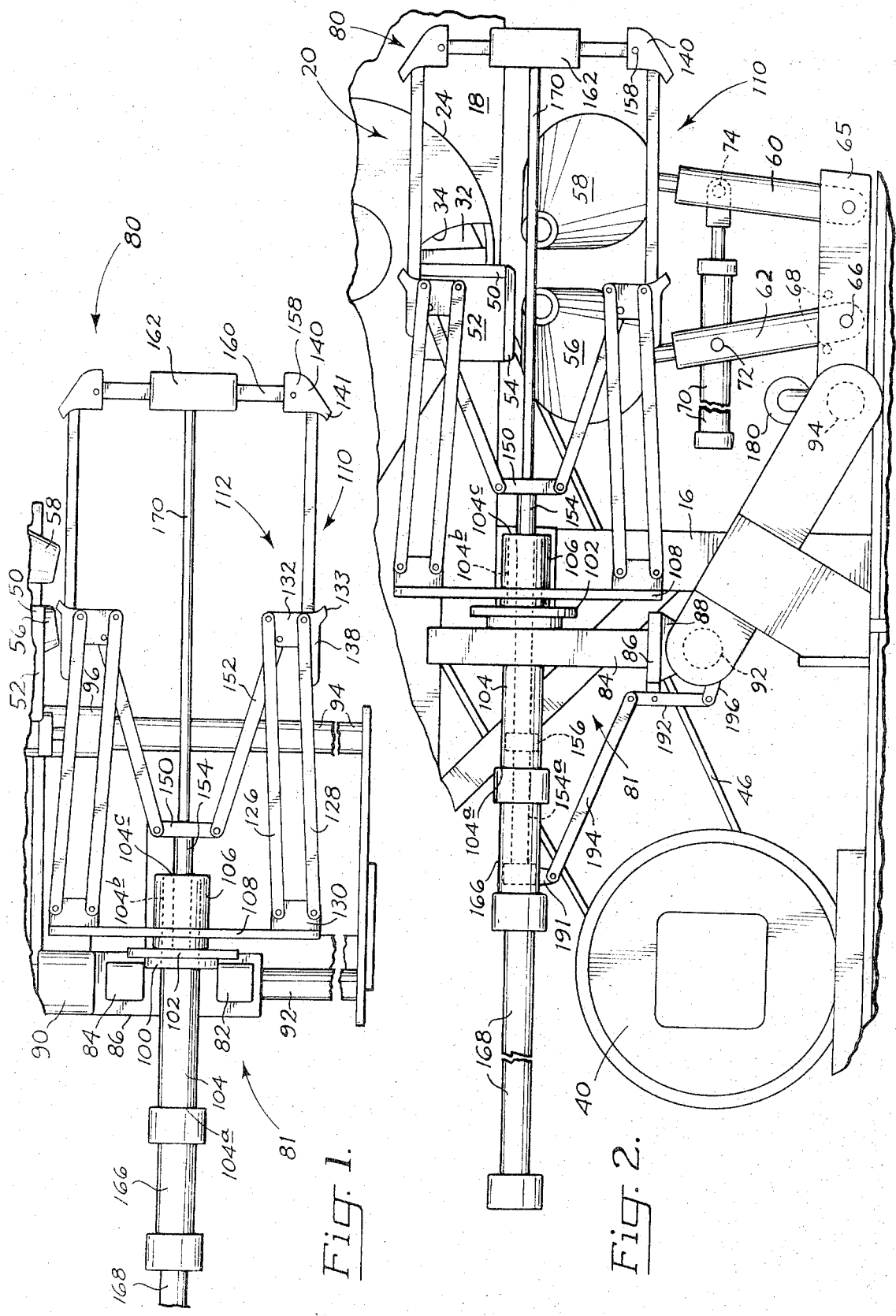

APPARATUS FOR PROCESSING TIRE CASINGS

This application is a continuation-in-part of an application filed Nov. 29, 1971, given Ser. No. 202,967, entitled "Apparatus For Preparing Fragments From Tire Casings", now U.S. Pat. No. 3,731,884.

This invention relates generally to apparatus for destroying tire casings, and more particularly to apparatus of this description which destroy tire casings by producing cut fragments therefrom.

In earlier filed application Ser. No. 202,967, apparatus is disclosed operable to cut tire fragments from the periphery of the casing as such is relatively rotated with respect to a cutting means in the apparatus. Fragments are cut progressing inwardly on the casing from all soft regions of the casing, i.e., the tread and sidewall regions, to leave as remaining integral pieces only the metal reinforced bead regions found in a usual tire casing.

In such apparatus, squeeze members are provided which come up against opposite sides of the tire casing with the casing mounted in the machine, and these deform the casing in the region where cutting takes place, to flatten it and bring the sidewalls together, and with folding of the tread. A cutting device is moved in successive passes over the periphery of the casing with the casing in this flattened condition.

In such apparatus, there is furthermore provided means for mounting a tire casing in the form of clamp means which clamps onto the bead region of the tire casing thus to hold the casing while the same is flattened by the squeeze members. The clamp means includes a mounting structure which in operative position extends into the central void region circumscribed by the usual tire casing. Radiating from this mounting structure are clamps which are adapted to be brought together to clamp onto the bead region of the tire casing and hold it. These clamps are adjustable radially with respect to the mounting structure. The clamps are adjusted radially outwardly in the event that the machine is adjusted to handle a larger diameter tire casing, and radially inwardly to adapt the machine to handle a smaller diameter tire casing.

A general object of this invention is to provide in such apparatus including clamp means for clamping onto the bead region of a tire casing, means for changing the position of a tire casing confining means whereby such may be moved toward the axis of a tire casing held by the clamp means with the clamp means adjusted to mount a smaller diameter tire casing, and moved in the opposite direction with the clamp means adjusted to clamp onto a larger diameter tire casing.

A further object is to provide apparatus for preparing fragments from tire casings, which includes clamp means for holding onto the bead region of the casing which is advanced toward cutting means as fragment cutting progresses, and tire casing confining means for flattening the casing adjacent where the same is being cut, said confining means maintaining its position relative to the clamp means with the latter advanced toward the cutting means, but being shiftable with respect to the clamp means with adjustments made in the clamp means to handle different sizes of tire casings.

The feature that the tire casing confining means shifts with adjustments made to accommodate a change in tire size handled is very important, since this enables the confining means properly to flatten all regions of a tire casing other than the bead region, and to do this irrespective of whether large or small diameter tire casings are being destroyed.

Various other objects and advantages of the invention will become more fully apparent as the following description is read in conjunction with the accompanying drawings, wherein:

FIG. 1 is a top plan view of portions of apparatus as contemplated herein;

FIG. 2 is a side elevation of portions of said apparatus;

Figure 3:
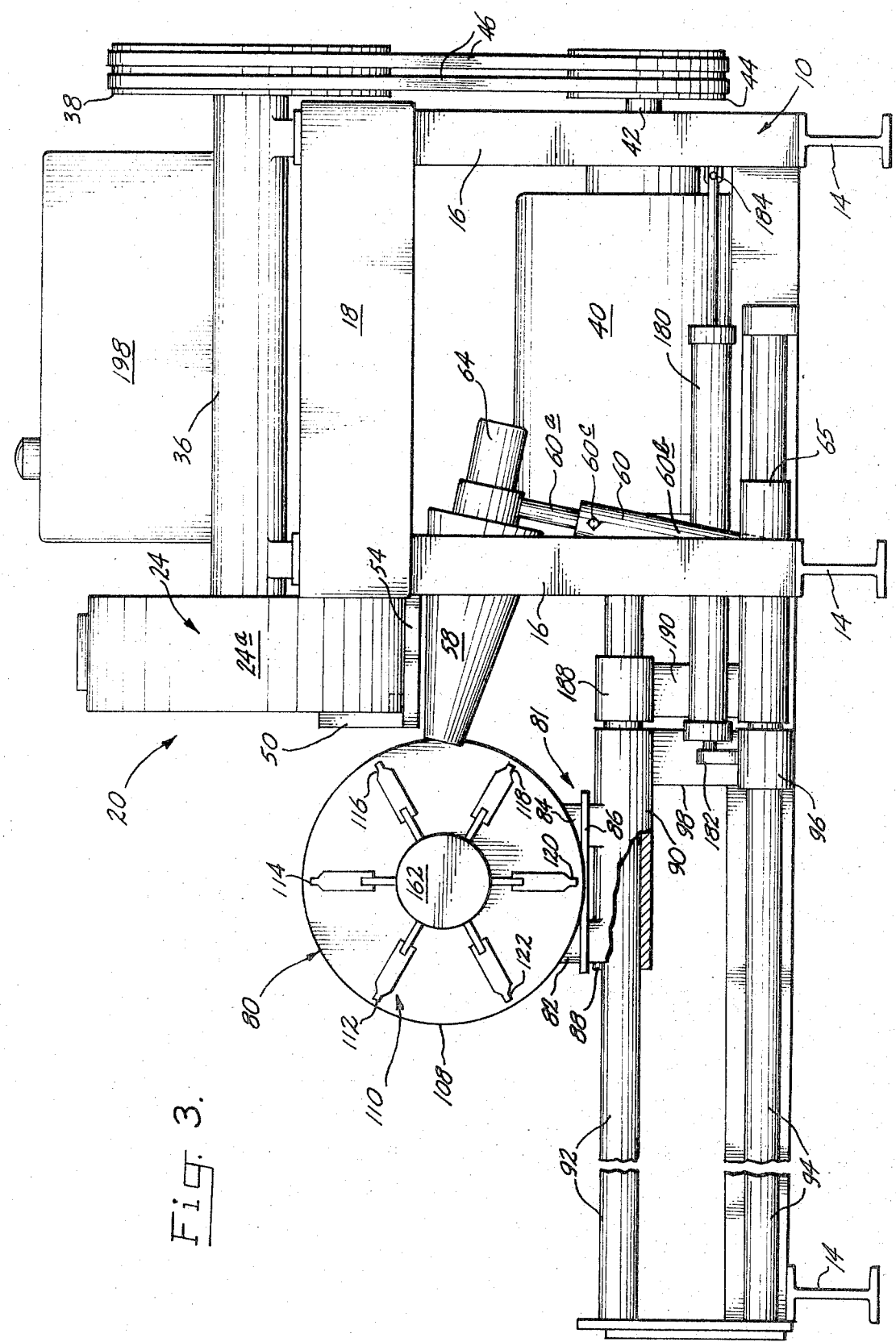
FIG. 3 is an end elevation of the device, viewing it from the end presented to the right in FIG. 2.

Considering now in more detail the embodiment of the invention illustrated in FIGS. 1, 2 and 3, and referring to FIG. 3, the apparatus illustrated includes a frame comprising a base made up of beams 14 which normally rest on the floor, and posts 16 suitably secured to the base supporting what is referred to as an elevated table or platform 18.

Table 18 is used in the mounting of a cutting means given the general reference numeral 20 which is actuated to cut fragments from the periphery of a tire casing as the casing is progressively rotated and advanced toward the cutting means, in a manner to be described.

Cutting means 20 includes a hollow housing 24 having a revolving cutter structure mounted within it. Such cutter structure includes one or more cutters such as the one shown at 32 in FIG. 2 which is moved in a circular sweep on rotation of the cutter structure, and opening 34 adjacent the base of the housing in FIG. 2 exposes these cutters as they sweep past the base. The cutter structure is power driven as by motor 40 shown in FIG. 3 driving belts 46 that rotate a shaft (not shown but within arbor tube 36) joined to the cutter structure.

Also part of the cutting means is an anvil 50 positioned as shown in FIGS. 2 and 3 with the anvil partially extending into the housing through opening 34. The anvil has a vertical and a joining horizontal edge inside the housing adjacent the path of corresponding edges in cutters 32. As a consequence, a cutter on moving past the anvil produces a shearing action which cuts off a fragment from any casing of the tire disposed against the anvil. The anvil is mounted in place through a plate 52 which is joined to a bracket 54 secured to platform 18.

Means is provided for revolvably supporting the tire casing as fragments are cut therefrom, such means being referred to also herein as a tire casing confining means. Such tire casing confining means includes opposed squeeze members in the form of tapered rollers 56, 58 which operate to confine a tire casing by bearing on opposite sides of the casing outwardly from its bead structure whereby this portion of the casing is flattened. Each of the rollers 56, 58 is supported on the upper extremity of a roller support exemplified by supports 60, 62. The rollers are rotatably mounted for rotation about their axes and a motor, such as the hydraulic motor shown at 64 in FIG. 3, is connected to each roller which operates to rotate the roller under power with energizing of the motor. Each roller support includes a member such as shown at 60a telescopically received in a member 60b secured in place as by fastener 60c. This structure permits adjustments to be made in the effective length of the roller support and thus permits adjustments in the positioning of a tapered roller with respect to the housing 24.

Each roller support adjacent its base is journaled as at 66 on a platform 65, for swinging movement about a nearly horizontal axis. Limiting movement of roller support 62 are abutments 68. A fluid-operated ram 70 with its cylinder journaled at 72 to support 62 and its rod journaled at 74 to support 60 is extended to swing support 60 in FIG. 2 to the right of support 62, thus to spread the rollers apart. In mounting a tire casing in the apparatus, the rollers are moved apart which permits one side of the tire casing to be brought up against roller 56. Preferably the tire casing is positioned so that the bead region of the tire casing is directly adjacent but beyond the smaller diameter end of roller 56, with substantially all of the side of the tire casing with the exception of its bead region positioned along side the roller 56. Ram 70 may then be actuated to bring the two rollers toward each other. When this is done, the rollers in effect pinch the tire casing by bearing on its sidewalls, whereby the tire casing, where such is presented to the cutting means for cutting, comprises, at least during initial cutting, the tread of a casing folded back on its self in a U-shaped bite. With the tread cut away, it is portions of the two sidewalls pressed together which are moved into the cutting means.

The hydraulic motors connected to the rollers produce movement of a tire casing, with portions of the tire casing being subjected to cutting moving upwardly into housing 24 and against the anvil as cutting progresses. The casing during such cutting is revolved about its axis as will be gone into in further detail. The hydraulic motors, therefore, constitute a means for rotating the casing under power about this axis.

Also part of the means for supporting a tire casing is a mechanism which grips a tire casing through its bead region, used in advancing the casing by shifting it laterally of its axis to advance material into the cutting means as fragments are progressively cut off. This mechanism or means for gripping or clamping the bead region of a tire casing, is shown generally in the drawings at 80.

Further considering mechanism 80, a carriage 81 is provided in the form of a pair of posts 82, 84 having their bases joined to a plate 86 connected by gusset structure 88 to a sleeve 90. The sleeve is slidable on a guide rod 92 disposed horizontally in the machine and fixedly mounted in a position somewhat elevated above beams 18. Another fixedly mounted guide rod paralleling rod 92 but somewhat below it is shown at 94. A sleeve 96 slidable on guide rod 94 is joined to sleeve 90 by a plate 98. Sleeve 96 and plate 98 serve to inhibit sleeve 90 from rotating on guide rod 92. The carriage comprising the posts, sleeves and associated structure, is movable along a path defined by rods 92, 94.

Mounted in a fixed position on the carriage with such disposed between the posts as shown in FIG. 1, and rigidly supported thereon through block 100 and plate 102, is a cylinder 104. The cylinder extends from an end 104a through the plate and block and in an expanse indicated in dotted outline at 104b to an end 104c. Suitably journaled on this expanse 104b of the cylinder and constrained from axial movement therealong is a hub 106. A circular plate 108 having hub 106 joined to it at its center is mounted on the hub.

Plate 108 provides a mounting for multiple arms in a so-called spider structure generally shown at 110. In FIG. 3, six such arms are illustrated at 112 through 122. To obtain better clarity and simplicity in the drawings, only two such arm structures are shown in FIGS. 1 and 2, with the others having been removed.

With reference to FIG. 1, and considering arm structure 112, such includes an inner section including bars 126, 128 journaled on a bracket 130 which is secured to plate 108. Outer extremities of bars 126, 128 are pivotally mounted on a clamp unit 132. The clamp unit includes a radially outwardly projecting clamp finger or portion 133 utilized in engaging a tire casing at its bead region.

Each arm in the spider structure, and with continued reference to arm 112, includes an outer section exemplified by rod 136 slidably received within a guide portion 138 of the clamp unit. Joined to the outer end of the rod is a clamp unit 140 with a radially outwardly projecting clamp finger or portion 141.

The inner section of the various arms, made up of bars 126, 128 and clamp units 132, are actuated to move the clamp units radially outwardly (important in handling larger diameter tire casings) utilizing a collar 150 connected to the inner sections of the arms by links such as those shown at 152. The links are pivoted at their inner ends to the collar and at their outer ends to the various clamp units. The collar is rotatably mounted on a piston rod 154 which extends into cylinder 104 earlier discussed, and which has a piston 156 (see FIG. 2) joined to it disposed within the cylinder. The rod and cylinder make up a fluid-operated ram, and with extension of the ram the rod moves outwardly of the cylinder to move the collar outwardly with radial outward movement of the various clamp units 132 resulting.

Clamp units 140 which are joined to rods 136 making up the outer sections of the arms are pivotally joined as at 158 to guide rod 160. These guide rods are reciprocatively received within accommodating bores of a center guide 162. With the construction, and on clamp units 132 being shifted radially outwardly, the clamp units 140 will follow in this radially outward movement.

Mounted at the end of cylinder 104 is a spacer sleeve 166. Joined to the rear end of the spacer sleeve is another cylinder 168. Associated with this cylinder is an elongate piston rod 170 which joins with a piston (not shown) disposed within cylinder 168. Piston rod 154 is hollow, thus to accommodate the passage of rod 170 down through its interior. Center guide 162 is journaled on the right end of piston rod 170 in FIG. 2.

Rod 170 and cylinder 168 together make up a fluid-operated ram which is used in shifting center guide 162 in an axial direction. With movement of the center guide 162 inwardly, or to the left in FIG. 1, clamp units 140 are made to shift toward clamp units 132, and with movement of the guide outwardly, clamp units 140 move in the opposite direction.

Carriage 81, comprising sleeves 90, 96, plate 98, and the spider structure supported by the carriage, are shifted laterally of the axis of any tire casing supported on the spider structure (which is to say along the path of movement provided by the guide rods 92, 94) utilizing ram 180 shown in FIG. 3, which has its cylinder end connected to the carriage at 182 and its rod end anchored to the frame at 184.

Roller supports 60, 62 have been described supporting the tapered rollers that are brought together to confine opposite sides of a tire casing being processed. Platform 65, earlier described, upon which the bottoms of these roller supports are journaled, is permitted a limited amount of movement in the apparatus paralleling the path of movement of carriage 81. Further explaining, as perhaps best illustrated in FIG. 3, slidably mounted on rod 92 along with sleeve 90 is a sleeve 188. Yet another sleeve (obscured by the platform 65 in FIG. 3) is slidably mounted on rod 94, and these two sleeves are joined together by a plate 190. These two sleeves and plate 190 constitute another carriage 195 which mounts platform 65.

As should be apparent from a reading of the description so far, when a tire casing is mounted on clamp means 80 with its bead region clamped between clamp units 132, 140, the tire casing will be centered on the spider structure with its axis generally corresponding to the axis of rod 170. With the tire casing so clamped, it is desired that the squeeze members, i.e., the tapered rollers 56, 58, be positionable against opposite sides of a tire casing with the smaller diameter ends of these rollers, i.e., the ends of the rollers shown in FIG. 1, closely adjacent but not actually contacting the bead region of the tire casing. It should be apparent that with that with tire casings of different sizes, the tapered rollers or squeeze members must be shifted either toward or away from the axis of the casing held by the clamp units 132, 140 to obtain this desired relationship. Thus, with clamp units 132, 140 shifted radially outwardly to grip onto a larger diameter tire, the tapered rollers should be shifted away from the axis of the casing gripped by these clamp units. With the clamp units moved radially inwardly to accommodate a smaller tire casing, the squeeze rollers should be moved toward the axis of the casing gripped by the clamp units.

To produce this positioning of the squeeze members, carriage 195 supporting platform 64 carrying the base of roller supports 60, 62 is adjusted with respect to carriage 81 mounting the spider structure. With a large diameter tire casing, and referring to FIG. 3, carriage 81 carrying the spider structure would be shifted away from carriage 195 carrying the roller supports and rollers. With smaller diameter tire casings, the adjustment of the two carriages would be toward each other on guide rods 92, 94. In accordance with this invention, this adjustment is performed automatically in the apparatus, in response to actuation of the fluid-operated ram formed by cylinder 104 and rod 154.

Further explaining, and referring to FIG. 2, a hollow spacer 166 has earlier been described spacing cylinder 104 from cylinder 168. Rod 154 extends out from both ends of cylinder 104 and has a protruding portion 154a which is received within the confines of the hollow spacer 166. Secured to this protruding portion, and projecting downwardly through the bottom of the spacer through an accommodating slot, is a lug 191.

With continued reference to FIG. 2, shown at 192 is a pivoted lever arm which is pivoted to plate 86 of carriage 81. The upper end of the lever arm is connected by link 194 to lug 191. The lower end of the lever arm is connected to a bell crank member partially shown at 196. The bell crank member in turn is linked (not shown) to the subcarriage which supports platform 65. The linkage is such that on actuation of the ram made up of cylinder 104 and rod 154, whereby collar 150 is caused to move to the right in FIG. 2 (such movement producing radially outward movement of the clamp units as when accommodating a larger size tire casing), carriage 81 is made to shift on rods 92, 94 slightly away from carriage 195. With reverse actuation of this ram, of course, a reverse type of adjustment takes place.

Generally describing the operation of the apparatus as described, to load a tire casing onto the apparatus, tapered rollers 56, 58 are swung apart by actuation of ram 70. Collar 150 is positioned, through actuation of the ram made up of cylinder 104 and rod 156, to position the clamp units radially inwardly in a position to enable the tire casing to be inserted onto the spider structure with the bead region of the casing passing over clamp units 140. The ram made up of cylinder 168 and rod 170 is extended prior to tire placement a sufficient distance to enable the casing to rest conveniently on rods 136. The spider structure, also referred to herein as clamp mounting structure, extends into and through the central void region circumscribed by the tire casing.

With the tire casing thus positioned, the ram comprising cylinder 104 and rod 154 is actuated to extend radially outwardly the clamp units and bars 136, with the bars coming up against the inner periphery of the casing defined by the bead region of the casing. The ram comprising rod 170 and cylinder 168 is actuated whereby clamp units 140 are caused to be moved axially toward clamp units 132. The clamp portions or clamps that are projecting radially outwardly on the various clamp units come together to grip onto the outer surfaces of the bead region in the casing. The tire is now held with its axis coinciding with the axis of rod 170.

Prior to cutting fragments, ram 70 is actuated to bring the tapered rollers together with confinement of the tire casing by pinching it from the sides.

With the tire casing mounted, the casing is caused to revolve about its axis through actuation of the hydraulic motors which power the tapered rollers. The spider structure is so constructed that it is permitted to rotate freely while supporting the tire casing.

To produce progressive cutting up of the tire casing, carriage 81 which supports the spider structure is caused to advance along the guide rods 92, 94 to move the periphery of the tire casing into the opening provided at the base of housing 24, thus to expose peripheral portions of the casing to the cutting action provided by the anvil and the cutters described. With such movement of the spider structure, carriage 195 supporting squeeze rollers 56, 58 also advances along guide rods 92, 94, the relative position of the carriage supporting the spider structure and the carriage supporting the squeeze rollers being maintained once the desired radial setting of the clamp units 132, 140 has been obtained by actuation of the ram comprising cylinder 104 and rod 154. Cutting of the tire casing proceeds with revolving of the casing and advancing of the casing, until all that substantially remains of the casing are the two beads which form the inner perimeter of the tire casing at each of its sidewalls. With cutting finished, carriage 81 is retracted, the rollers 56, 58 are separated, and the spider structure is collapsed with extending of clamp units 140, to permit removal of these beads.

Figure 4:
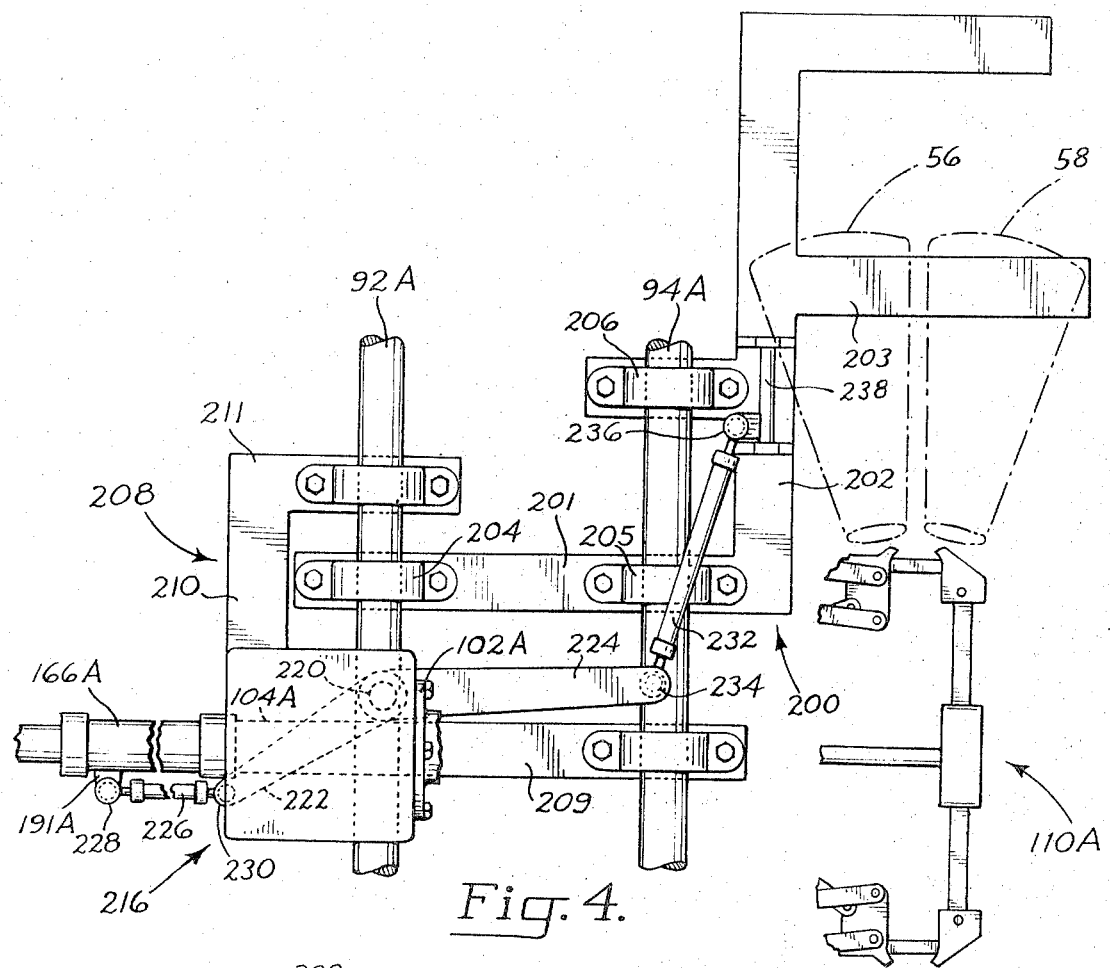
FIG. 4 is a plan view of a modified form of apparatus with parts removed to illustrate more clearly details of construction.
Figure 5:
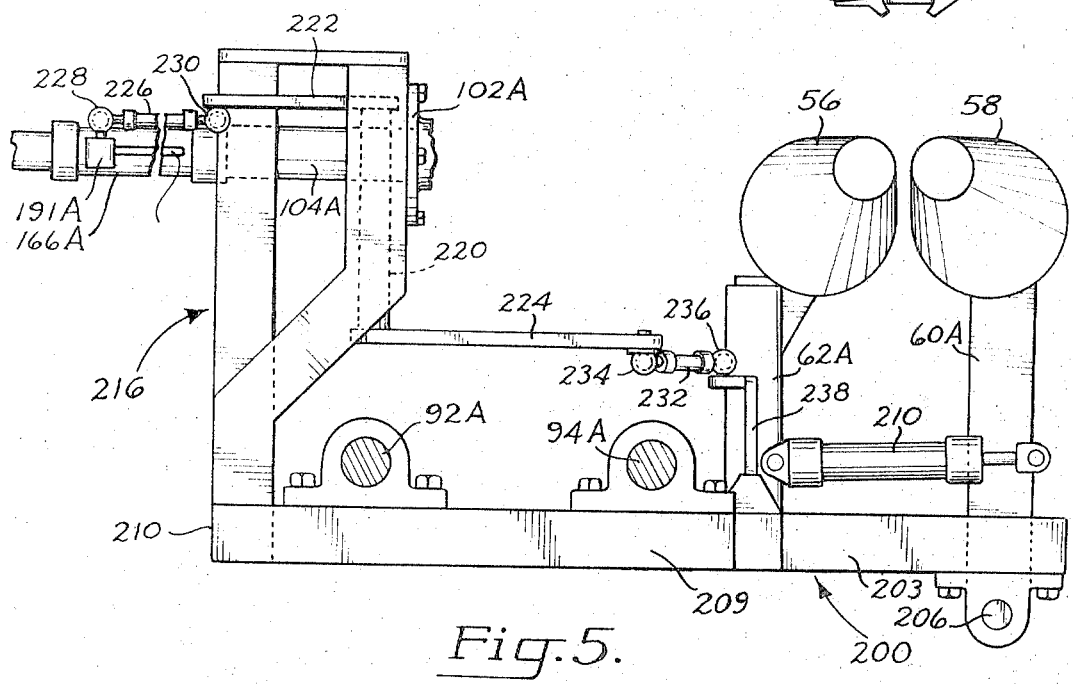
FIG. 5 is a side elevation of the apparatus as pictured in FIG. 4.

In FIGS. 4 and 5, portions of apparatus constructed according to a modification of the invention are illustrated. The structure illustrated in these figures features a rotatably mounted rock shaft which rotates about its axis when coordinating movement of the carriage supporting the spider structure and the carriage supporting the squeeze members or tapered rollers.

Referring to FIGS. 4 and 5, in this modification of the invention the carriage which mounts the squeeze members or tapered rollers 56, 58 is shown at 200. The carriage includes members 201, 202, 203 rigidly joined together. Roller support 62A mounting roller 56 is mounted on the carriage in a fixed, upright position. Roller support 60A is mounted on the carriage for swinging movement about a shaft 206. Producing swinging movement of this roller support, with movement of roller 58 toward and away roller 56, is a ram 210.

The stationary, frame-supported guide rods which mount carriage 200, and which correspond to rods 92, 94 in the modification of the invention shown in FIGS. 1 through 3, are shown at 92A and 94A. In the modification of FIGS. 4 and 5, these guide rods occupy a common horizontal plane. Slidably mounting carriage 200 on guide rods 92A, 94A are bearing sleeves 204, 205, 206.

The carriage which supports the spider structure in FIGS. 4 and 5 is indicated at 208. This carriage includes rigidly joined members 209, 210, 211. The carriage is slidably supported on rods 92A, 94A through bearing sleeves 212, 213, 214.

The carriage carries post structure 216 mounting adjacent the top thereof spider structure partially shown at 110A. This spider structure in substantially all details may resemble the structure described in connection with the modification shown in FIGS. 1 through 3.

Although omitted from the drawings for reasons of simplicity, it should be understood that the apparatus of FIGS. 4 and 5 also includes cutter means, and that to produce advancement of a casing held by rollers 56, 58 during fragment cutting, carriages 200, 208 are advanced simultaneously toward the cutting means, or upwardly in FIG. 4. This movement may be produced as by actuation of a ram (not shown) connected to carriage 208.

In the form of the invention shown in FIGS. 4 and 5, the spacer 166A corresponding to spacer 166 shown in the first-described modification is slotted along its side, at 220, to accommodate outwardly projecting horizontally disposed lug 191A.

As pictured in FIGS. 4 and 5, with actuation of the ram including cylinder 104 producing radial extension of spider structure 110A, lug or actuating means 191A moves along slot 220. This movement produced in lug 191A is utilized in adjusting carriage 200 with respect to carriage 208, through rotating of a vertically disposed, rotatably mounted rock shaft 220. As pictured in the drawings, such shaft is suitably journaled within the post structure 216. Secured to the shaft adjacent its top end is a lever arm 222 substantially at the level of lug 191A. Secured to the shaft adjacent its bottom end is another lever arm 224. A link 226 which is adjustable in length is journaled at 228 to lug 191A, and at 230 to arm 220. Another somewhat similar link 232 is journaled at 234 to arm 224 and at 236 to a post 238 which is part of carriage 200.

From the above it will be seen that with movement of lug 191A to the right in FIG. 4 such produces downward swinging of arm 222 as pictured in the drawing, with counterclockwise rotation of shaft 220 and upward swinging of arm 224. This is reflected in movement of carriage 200 away from carriage 208. Movement of lug 191A to the left produces reverse relative movement of carriage 200 with respect to carriage 208.

Referring again to FIG. 1, it will be apparent that with movement of collar 150 to the right to extend the spider structure, initially rod 154 has to travel a lesser distance to obtain a given amount of radial outward shift of the clamp units, than is the case when the rod has extended to some extent and links 152 have assumed a position more nearly normal to the axis of rod 154. Put in another way, the radial outward extension of the spider structure is not lineally related to the extension of rod 154, but instead, as the rod extends the radial extension of the spider structure will take place at an ever decreasing rate. With the provision of the rock shaft 220 as illustrated in FIGS. 4 and 5, and the provision of the arms 222, 224 which swing in related arcs, it is possible to obtain movement in carriage 200 at a similar decreasing rate, closely approximating the rate of decrease in the spider extension. As a consequence, the position of the smaller diameter ends of the squeeze members or rollers may be closely maintained directly adjacent the bead region of a tire casing mounted in the spider structure, with the spider structure adjusted to take a wide range of tire sizes.

It is claimed and desired to secure by Letters Patent:

1. In apparatus for preparing fragments from tire casings including clamp means for holding a tire casing by clamping onto the bead region of the casing, such clamp means being adjustable to conform to different diameters of bead regions in said casings, tire casing confining means spaced radially of the axis of a tire casing held in said clamp means operable to confine a tire casing by bearing against opposite sides of a tire casing held by said clamp means, means increasing and decreasing the spacing of said casing confining means relative to the axis of a tire casing held by said clamp means with adjustment of said clamp means to conform to larger and smaller diameters of said bead regions, respectively, and means for cutting fragments from a tire casing confined by said confining means.

2. The apparatus of claim 1, wherein said cutting means and clamp means are relatively movable as cutting of a tire casing progresses to move the axis of a casing held by said clamp means toward said cutting means, said tire casing confining means maintaining substantially a fixed spacing with respect to the axis of a casing held by said clamp means during such relative movement of said clamp means and cutting means.

3. The apparatus of claim 1, wherein said clamp means comprises clamp mounting structure which in operative position extends into the central void region circumscribed by the usual tire casing, and radially adjustable clamps radiating from said mounting structure adapted to clamp onto the bead region of a tire casing, the apparatus further comprising power-operated means for producing radial adjustments in said clamps to accommodate different diameters of tire bead regions, the means increasing and decreasing the spacing of said tire casing confining means relative to the axis of a tire casing held by said clamp means comprising means operated by said motor means.

4. Apparatus for preparing fragments from tire casings and the like comprising clamp means for clamping onto the bead region of a tire casing, said clamp means including clamp mounting structure which in operative position extends into the central void region circumscribed by the usual tire casing and adjustable clamps radiating from said mounting structure adapted to clamp onto the bead region of a tire casing, said clamps being adjustable radially of said mounting structure to accommodate different diameters in said bead regions, opposed squeeze members adapted to be brought up against opposite sides of a tire casing held by said clamp means thus to confine the casing, a mounting for said squeeze members accommodating the positioning of said squeeze members at different radial spacings from the axis of a casing held by said clamp members, power-operated means for adjusting said clamps radially with respect to said mounting structure, means connecting said power-operated means and the mounting for said squeeze members producing movement of the squeeze members away from said mounting structure and the axis of a casing held by said clamp means with said clamps adjusted radially outwardly from said mounting structure and movement of said squeeze members toward said mounting structure with said clamps adjusted radially inwardly toward said mounting structure, and means for cutting fragments from a tire casing confined by said squeeze members.

5. The apparatus of claim 4, wherein said power-operated means for adjusting said clamps comprises a ram, actuating means is connected to said ram which follows extension and contraction of said ram, and the means connecting said power-operated means and the mounting for said squeeze members comprises a rotatably mounted rock shaft, a first lever arm joined to said shaft linked to said actuating means, and a second lever arm joined to said shaft linked to the mounting for said squeeze members.

* * * * *